United States Patent [19]

Egawa

[11] Patent Number: 4,555,990
[45] Date of Patent: Dec. 3, 1985

[54] ROTARY BOARD

[75] Inventor: Kinsho Egawa, Miyagi, Japan

[73] Assignee: Genroku Corporation, Japan

[21] Appl. No.: 614,801

[22] Filed: May 29, 1984

[51] Int. Cl.⁴ ............................................. A47B 11/00
[52] U.S. Cl. ........................................ 108/20; 108/139
[58] Field of Search ................ 108/20, 103, 139, 142; 219/10.55 F, 10.55 E, 10.55 D

[56] References Cited

U.S. PATENT DOCUMENTS

| 905,018 | 11/1908 | Sullivan et al. | 108/20 |
| 3,142,269 | 7/1964 | Keck | 108/20 |
| 3,713,619 | 1/1973 | Marty | 108/139 X |
| 3,760,745 | 9/1973 | MacManus | 108/139 |
| 4,239,009 | 12/1980 | Cunningham | 108/20 |
| 4,258,966 | 3/1981 | Grubb, Jr. | 108/139 X |
| 4,330,696 | 5/1982 | Pomerov et al. | 108/20 |
| 4,504,715 | 3/1985 | Jorgensen | 108/20 X |

FOREIGN PATENT DOCUMENTS 688530 3/1965 Italy ...................................... 108/20

Primary Examiner—William E. Lyddane
Assistant Examiner—Peter A. Aschenbrenner
Attorney, Agent, or Firm—Cantor and Lessler

[57] ABSTRACT

A rotary board for serving dishes on, comprises a generally annular base member (2), and a circular board (B) driven by a motor (8) installed in the base member (2). Ball bearing units (5, 5') are mounted between the board (B) and the base (2), which comprise a pair of coaxial ball bearing units (5, 5') the inner rings (4, 4') of which are fastened together and driven by the motor (8). The lower one (3') of the outer rings of the ball bearing units is fastened to the base member (2), while on the upper outer ring (3) rests the board (B), whereby the upper outer ring (3) and the board (B) thereon are permitted not only to rotate following the inner rings (4, 4'), but also to stay checked by hand while the inner rings are driven by the motor.

4 Claims, 3 Drawing Figures

ROTARY BOARD

FIELD OF THE INVENTION

The present invention relates to a rotary board on which to support things. Such board may preferably be used on a dinner table for serving dishes on, and may provide a convenience for the persons sitting at the table to choose and take favorite dishes.

BACKGROUND OF THE INVENTION

A prior art rotary board is installed in a table to form an integral table and rotary board, which is too big for domestic purposes. The prior art table and rotary board is also disadvantageous in that its rotating board member cannot be stopped during operation. Inconveniently, a person sitting at the table and rotary board needs to choose and take favorite dishes on the rotating board member carefully.

An object of the present invention is thus to provide a portable rotary board which can placed on an ordinary dinner table.

Another object of the present invention is to provide a portable rotary board which can be temporarily stopped during operation.

SUMMARY OF THE INVENTION

In order to achieve these objects, the rotary board according to the present invention comprises: a base member having an annular outer wall; a first ball bearing unit having an outer ring mounted on said base member, and an inner ring permitted to rotate with respect to said outer ring by means of balls confined therebetween; a second ball bearing unit having an inner ring coaxially mounted to said inner ring of said first ball bearing unit, and an outer ring permitted to rotate with respect to said inner ring of said second ball bearing unit by means of balls confined therebetween; a circular board member detachably mounted on said outer ring of said second ball bearing unit; and means for driving said inner ring of said first ball bearing unit to rotate, comprising a motor driven shaft rotatably supported on said base member and provided with a friction surface thereon maintained in engagement with the inner annular surface of said inner ring of said first ball bearing unit.

An electric motor for driving said shaft is preferably mounted on said base member.

Said friction surface is preferably provided by a rubber friction wheel mounted on said shaft.

DESCRIPTION OF THE DRAWINGS

The present invention will now be described, by way of example, with reference to the accompanying drawings, in which.

DESCRIPTION OF THE PREFERRED EMBODIMENT

Figure 1:
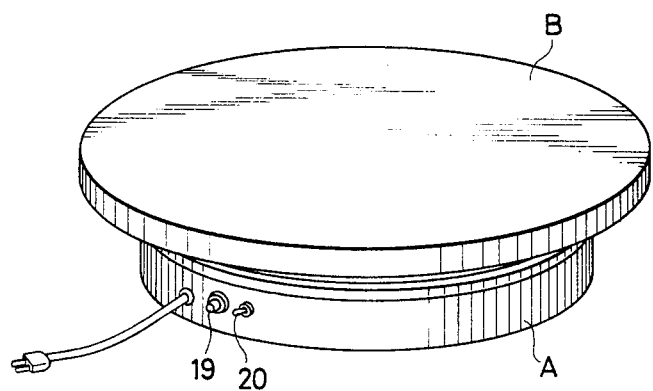
FIG. 1 is a schematic perspective view of an embodiment of the rotary board according to the present invention.

Referring first to FIG. 1, there is shown an embodiment of the invention, which essentially comprises a base structure A and a circular board B. The board B is rotatably supported on the structure, as described below.

Figure 2:
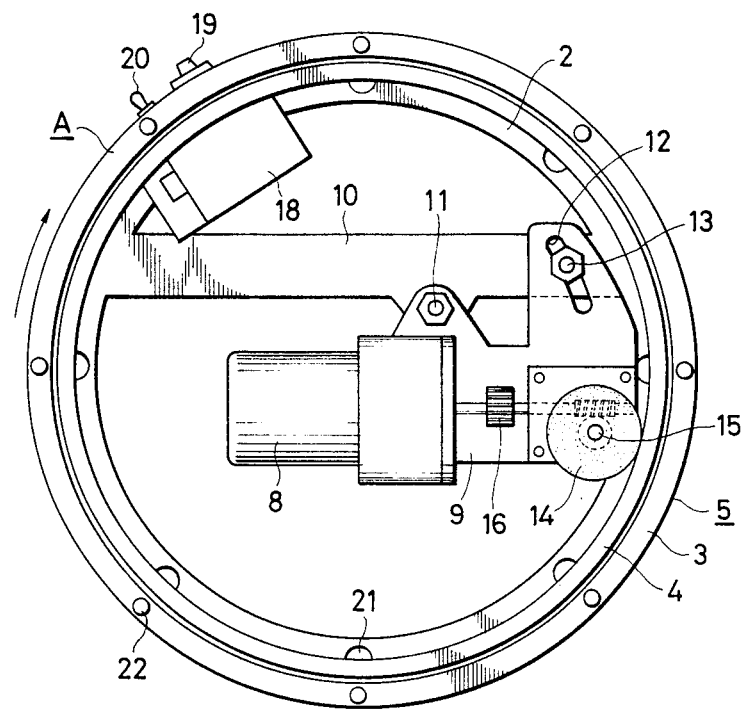
FIG. 2 is a plan view a base structure of the rotary board of FIG. 1, which structure rotatably supports a circular board member on which to support things, such as dishes.
Figure 3:
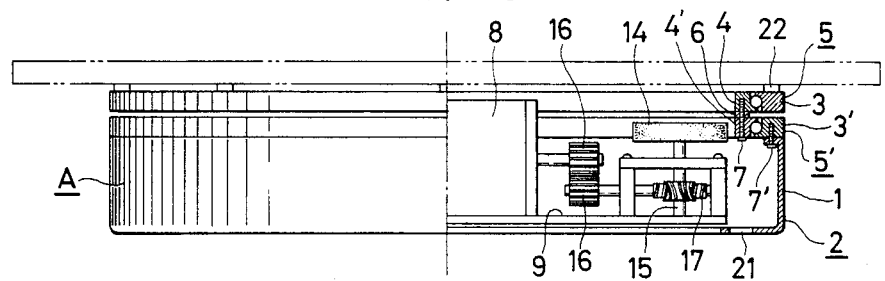
FIG. 3 is a side elevational view, partly in section, of the base structure of FIG. 2.

The base structure A includes a base member 2 having an annular outer wall 1, as shown in FIGS. 2 and 3. A first ball bearing unit 5' is provided on top of the base member 2, which comprises an outer ring 3' mounted on the annular upper surface of the outer wall 1 of the base member 2, and an inner ring 4'. The outer ring 3' is fastened to the upper edge portion of the outer wall 1 by means of bolts 7', as shown. The outer ring 4' is permitted to rotate with respect to the inner ring 3' by means of balls confined between these rings 3' and 4'.

A second ball bearing unit 5 is provided on the first unit 5', as shown. The second unit 5 is of a similar construction with the first unit 5', and has an inner ring 4 and an outer ring 3. The outer ring 3 is rotatable with respect to inner one 4 by means of balls confined between these rings. The inner rings 4' and 4 of these first and second ball bearing units, respectively, are coaxially fixed together, with spacers 6 interposed therebetween, by means of bolts 7. Thus, the second or upper ball bearing unit 5 cab be rotated by driving the inner ring 4' of the first or lower ball bearing unit 5'.

An electric motor 8 is mounted on a support plate 9 which in turn is pivoted by means of a fastening screw 11 to a cross bar 10 provided on the bottom portion of the base member 2. The position of the cross bar 10 can be adjusted by means of an arcuate slot 12 and a fastening screw 13 therethrough engaged in a threaded bore in the cross bar 10. A shaft 15 is supported vertically and rotatably on the support plate 9, and has at its upper end a friction wheel 14 made of rubber. The rotation of the motor 8 is transmitted through spur gears 16 and a worm gearing 17 to the shaft 15 and thus to the friction wheel 14. Reference numerals 18, 19, and 20 respectively denote a mechanism mounted on the base member 2 for controlling the speed of the motor, a control knob for controlling the speed control mechanism 18, and a main switch for turning on or off the motor 8. Reference numeral 21 denotes openings formed in the bottom flange portion of the base member 2, which will serve to stabilize the rotary board when the board is placed on a piece of an elastic or soft material, by allowing the material to somewhat protrude into the openings 21.

The board B is of a circular shape as shown in FIG. 1, and is made of an artificial stone. The board B, which is a separate member from the other components of the rotary board, is placed to rest on projections 22 formed on the upper surface of the outer ring 3 of the upper ball bearing unit 5.

The rotation of the friction wheel 14 driven by the motor 8 and engaged with the inner ring 4' of the ball bearing unit 5', is transmitted to this ring 4'. The inner ring 4 of the upper ball bearing unit 5, which is fixed to the ring 4' by the bolts 7, will rotate with this ring 4'. The outer ring 3 of the upper ball bearing unit 5 will rotate following the inner ring 4 by virtue of friction provided by the balls present between the rings 3 and 4. The board member B rested on the outer ring 3 of the upper ball bearing unit 5 is thus rotated by the motor 8.

When a person wants to take a dish on the board B thus rotated, he can stop the board B simply by checking it by hand without stopping the motor 8. The inner rings 4 and 4' of the ball bearing units 5 and 5' can be continuously rotated by the motor while the upper outer ring 3 stays checked together with the board B. Once the board B is released, the outer ring 3 carrying the board B will begin to rotate following the inner ring 4.

As can be understood from the above description and the drawings, the board B of the invention can be started and stopped by easy handling. The rotary board of the invention has a compact structure in which the motor 8 and other components are accommodated within the base member 2, and in which the bearings 5 and 5' and the board B are laid over the base 2. The overall height of such structure can be low. Therefore, the rotary board of the invention is particularly convenient for use on a dinner table.

While a preferred embodiment of the invention has been shown and described, it is to be understood that those skilled in the art may devise certain variations, modifications and/or substitution of the specific components as shown and described, without departing from the spirit and scope of the invention, as defined by the claims appended hereto.

What is claimed is:

1. A rotary board comprising:

a base member having an annular outer wall;
   a first ball bearing unit having an outer ring mounted on said base member, and an inner ring permitted to rotate with respect to said outer ring by means of balls confined therebetween;
   a second ball bearing unit having an inner ring coaxially mounted to said inner ring of said first ball bearing unit, and an outer ring permitted to rotate with respect to said inner ring of said second ball bearing unit by means of balls confined therebetween;
   a circular board member detachably mounted on said outer ring of said second ball bearing unit; and
   means for driving said inner ring of said first ball bearing unit to rotate, comprising a motor driven shaft rotatably supported on said base member and provided with a friction surface thereon maintained in engagement with the inner annular surface of said inner ring of said first ball bearing unit.

2. A rotary board as claimed in claim 1, in which an electric motor for driving said shaft is mounted on said base member.

3. A rotary board as claimed in claim 1, in which said friction surface is provided by a rubber friction wheel mounted on said shaft.

4. A rotary board as claimed in claim 2, in which said friction surface is provided by a rubber friction wheel mounted on said shaft.

* * * * *